United States Patent
Balevi et al.

(10) Patent No.: US 12,401,436 B2
(45) Date of Patent: *Aug. 26, 2025

(54) GRADIENT DROPPING FOR FEDERATED LEARNING

(71) Applicant: QUALCOMM Incorporated, San Diego, CA (US)

(72) Inventors: Eren Balevi, San Diego, CA (US); Taesang Yoo, San Diego, CA (US); Tao Luo, San Diego, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 897 days.

This patent is subject to a terminal disclaimer.

(21) Appl. No.: 17/648,113

(22) Filed: Jan. 14, 2022

(65) Prior Publication Data

US 2023/0231640 A1    Jul. 20, 2023

(51) Int. Cl.
| | |
|---|---|
| H04B 17/391 | (2015.01) |
| H04B 7/0417 | (2017.01) |
| H04B 7/0426 | (2017.01) |
| H04B 17/13 | (2015.01) |
| H04L 27/26 | (2006.01) |

(52) U.S. Cl.
CPC ......... *H04B 17/391* (2015.01); *H04B 7/0417* (2013.01); *H04B 7/0426* (2013.01); *H04B 17/13* (2015.01); *H04L 27/2614* (2013.01)

(58) Field of Classification Search
CPC .... H04B 17/391; H04B 17/13; H04B 7/0417; H04B 7/0426
USPC .......................................... 370/205
See application file for complete search history.

(56) References Cited

U.S. PATENT DOCUMENTS

| | | | |
|---|---|---|---|
| 8,331,466 B2 * | 12/2012 | Guo | H04L 27/2623 375/259 |
| 2021/0084505 A1 * | 3/2021 | Yoon | H04W 24/08 |
| 2021/0142223 A1 * | 5/2021 | Choudhury | G06F 16/901 |
| 2021/0158167 A1 * | 5/2021 | Sharma | G06N 3/084 |
| 2022/0114616 A1 * | 4/2022 | Ingram | G06Q 30/0276 |
| 2024/0064611 A1 * | 2/2024 | Xu | H04W 48/02 |

* cited by examiner

*Primary Examiner* — Christopher M Crutchfield
*Assistant Examiner* — Jean F Voltaire
(74) *Attorney, Agent, or Firm* — Procopio, Cory, Hargreaves & Savitch LLP

(57) ABSTRACT

A UE may identify a plurality of local model update elements associated with an updated local machine learning model. The updated local machine learning model may have been generated based on a global machine learning model received from a base station and a local dataset. The UE may identify one or more local model update elements of the plurality of local model update elements for update element dropping based on at least one of a channel gain, a PAPR specification, an RF emission specification, or an RF condition. The UE may transmit, to the base station over a multiple access channel via analog signaling, at least some local model update elements of the plurality of local model update elements based on dropping of the identified one or more local model update elements.

30 Claims, 12 Drawing Sheets

GRADIENT DROPPING FOR FEDERATED LEARNING

TECHNICAL FIELD

The present disclosure relates generally to communication systems, and more particularly, to federated learning with over-the-air (OTA) aggregation in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may identify a plurality of local model update elements associated with an updated local machine learning model. The updated local machine learning model may have been generated based on a global machine learning model received from a base station and a local dataset. The plurality of local model update elements may include a plurality of gradient elements or a plurality of updated local model parameters. The apparatus may identify one or more local model update elements of the plurality of local model update elements for update element dropping based on at least one of a channel gain, a peak-to-average-power ratio (PAPR) specification, a radio frequency (RF) emission specification, or an RF condition. The apparatus may transmit, to the base station over a multiple access channel via analog signaling, at least some local model update elements of the plurality of local model update elements based on dropping of the identified one or more local model update elements. The analog signaling may be associated with OTA aggregation.

In an aspect of the disclosure, a method, a computer-readable medium, and an apparatus are provided. The apparatus may be a base station. The apparatus may receive, from a UE over a multiple access channel via analog signaling, at least some local model update elements of a plurality of local model update elements based on dropping of one or more local model update elements of the plurality of local model update elements. The plurality of local model update elements may be associated with an updated local machine learning model at the UE. The updated local machine learning model may be based on a global machine learning model from the base station and a local dataset at the UE. The plurality of local model update elements may include a plurality of gradient elements or a plurality of updated local model parameters. The one or more local model update elements for update element dropping may be based on at least one of a channel gain, a PAPR specification, an RF emission specification, or an RF condition. The analog signaling may be associated with OTA aggregation. The apparatus may update the global machine learning model based on the received at least some local model update elements of the plurality of local model update elements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
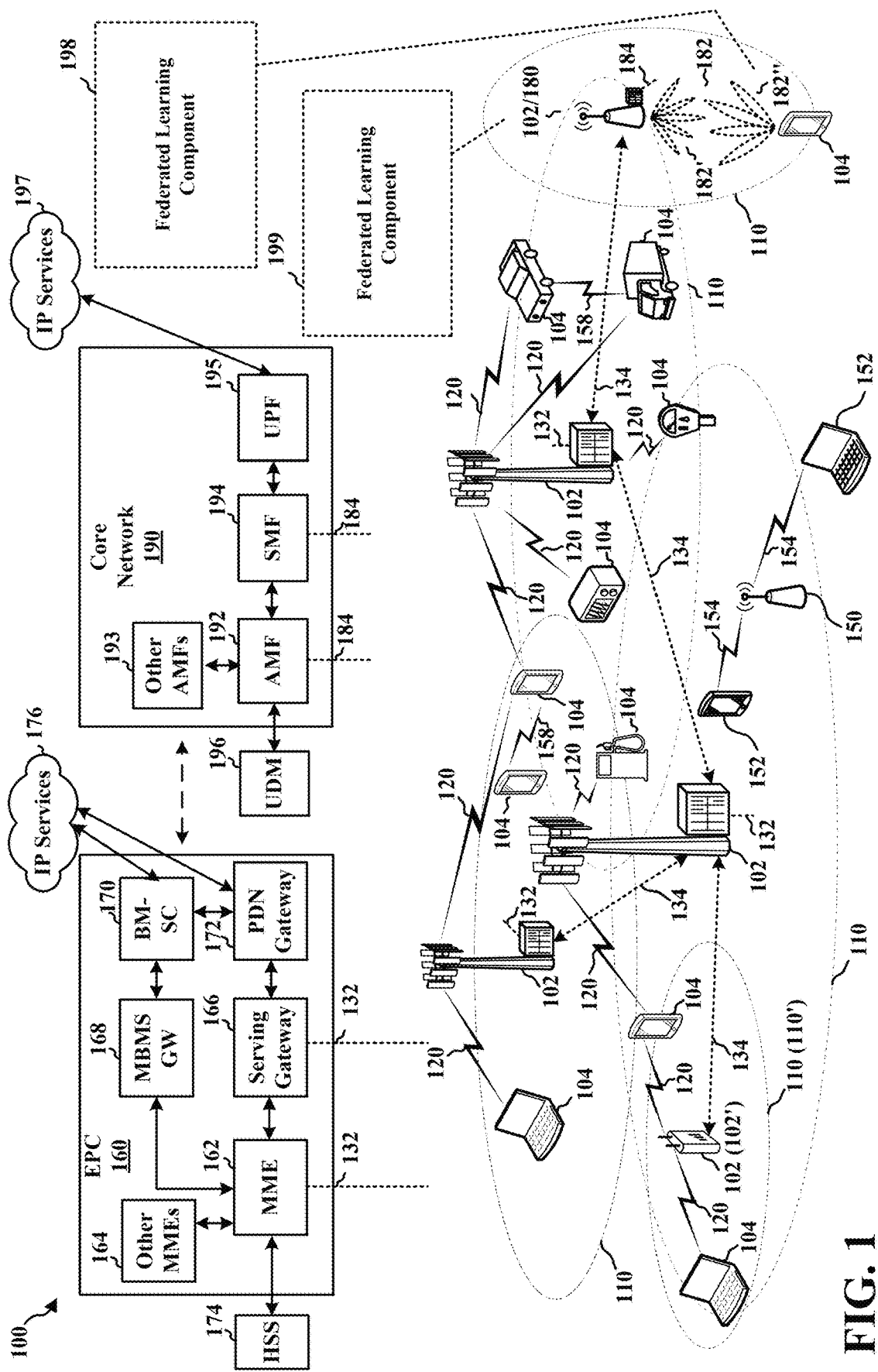
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a federated learning component 198 that may be configured to identify a plurality of local model update elements associated with an updated local machine learning model. The updated local machine learning model may have been generated based on a global machine learning model received from a base station and a local dataset. The plurality of local model update elements may include a plurality of gradient elements or a plurality of updated local model parameters. The federated learning component 198 may be configured to identify one or more local model update elements of the plurality of local model update elements for update element dropping based on at least one of a channel gain, a PAPR specification, an RF emission specification, or an RF condition. The federated learning component 198 may be configured to transmit, to the base station over a multiple access channel via analog signaling, at least some local model update elements of the plurality of local model update elements based on dropping of the identified one or more local model update elements. The analog signaling may be associated with OTA aggregation. In certain aspects, the base station 180 may include a federated learning component 199 that may be configured to receive, from a UE over a multiple access channel via analog signaling, at least some local model update elements of a plurality of local model update elements based on dropping of one or more local model update elements of the plurality of local model update elements. The plurality of local model update elements may be associated with an updated local machine learning model at the UE. The updated local machine learning model may be based on a global machine learning model from the base station and a local dataset at the UE. The plurality of local model update elements may include a plurality of gradient elements or a plurality of updated local model parameters. The one or more local model update elements for update element dropping may be based on at least one of a channel gain, a PAPR specification, an RF emission specification, or an RF condition. The analog signaling may be associated with OTA aggregation. The federated learning component 199 may be configured to update the global machine learning model based on the received at least some local model update elements of the plurality of local model update elements.

Figure 2:
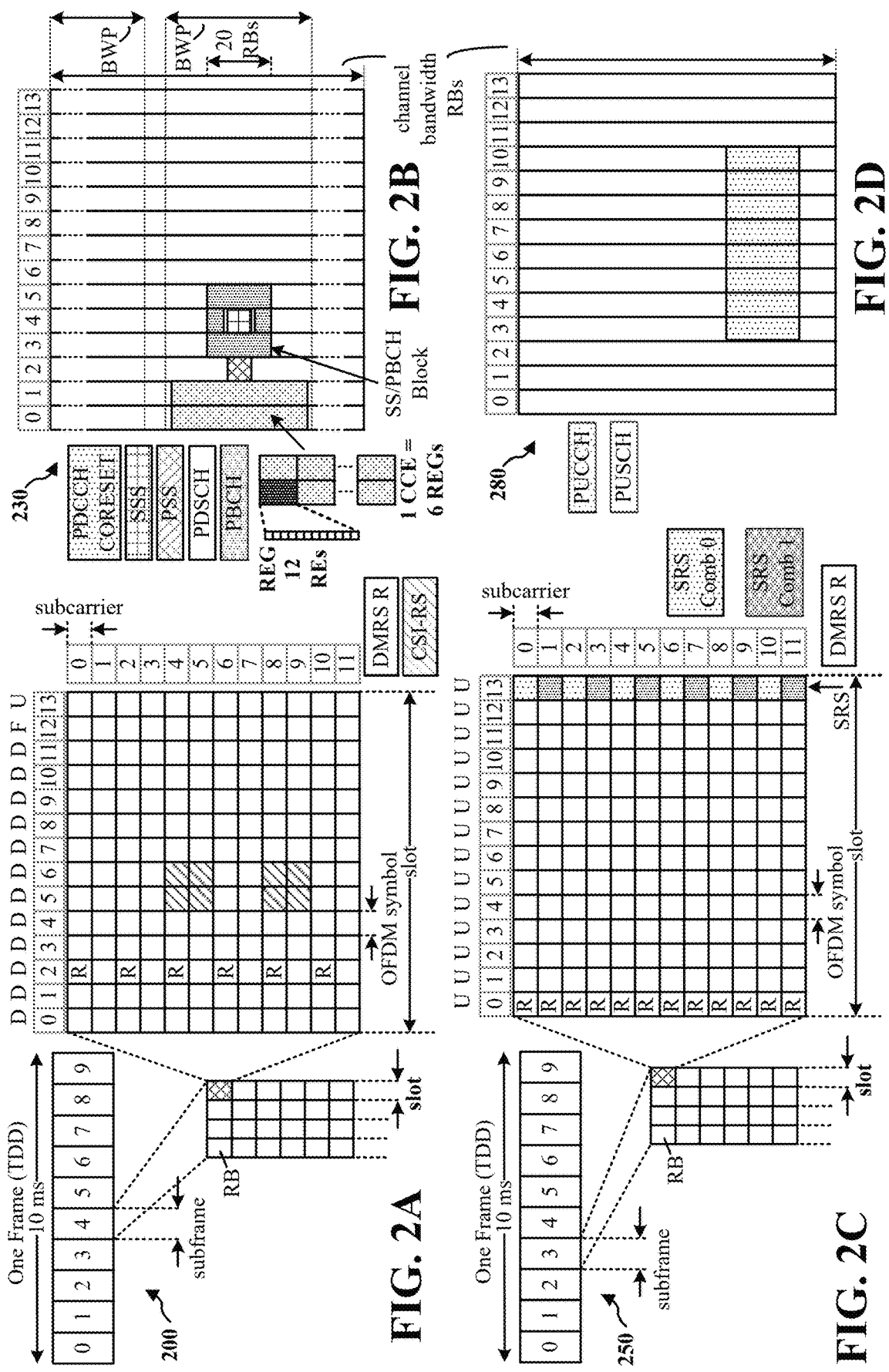
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^{\mu} \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
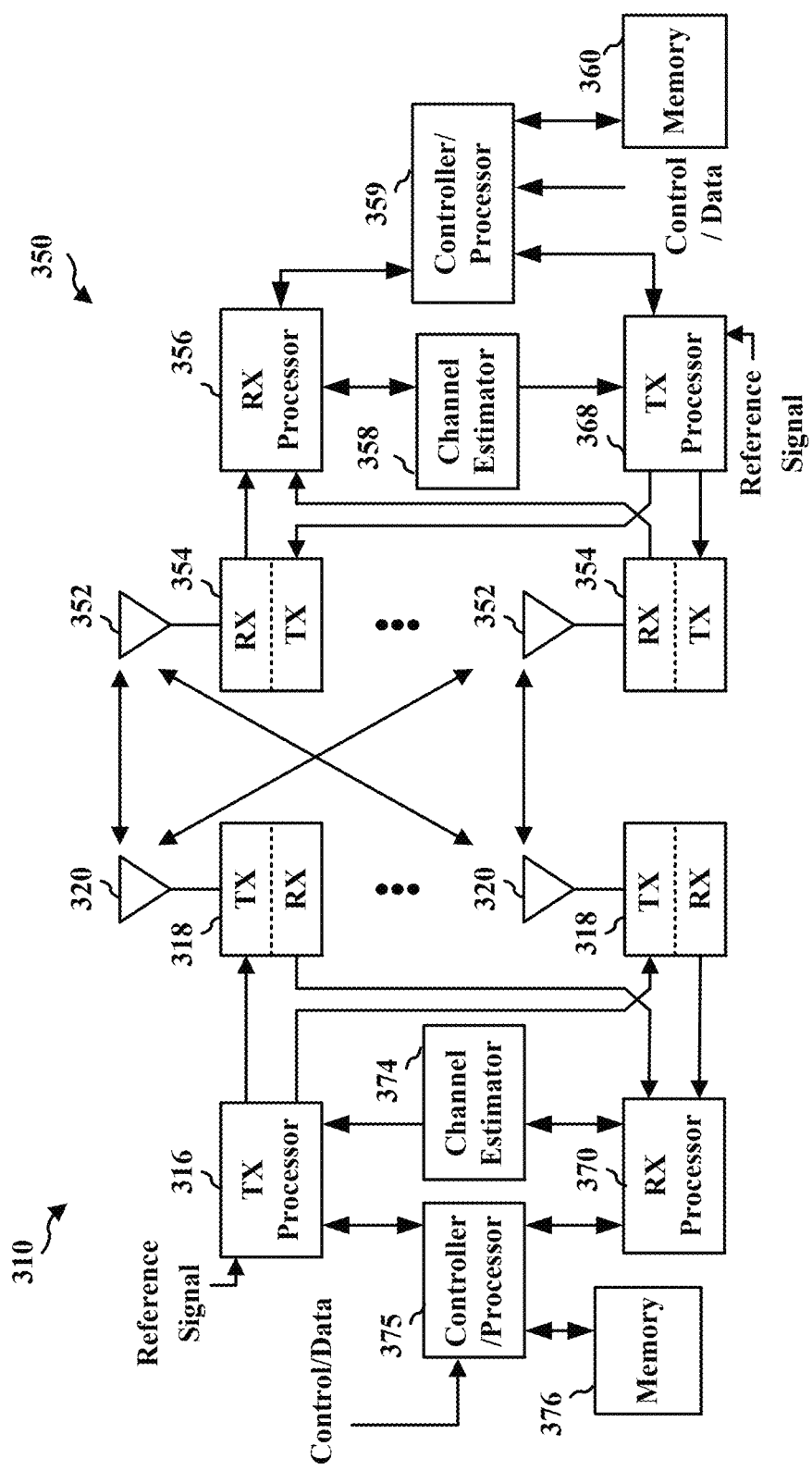
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
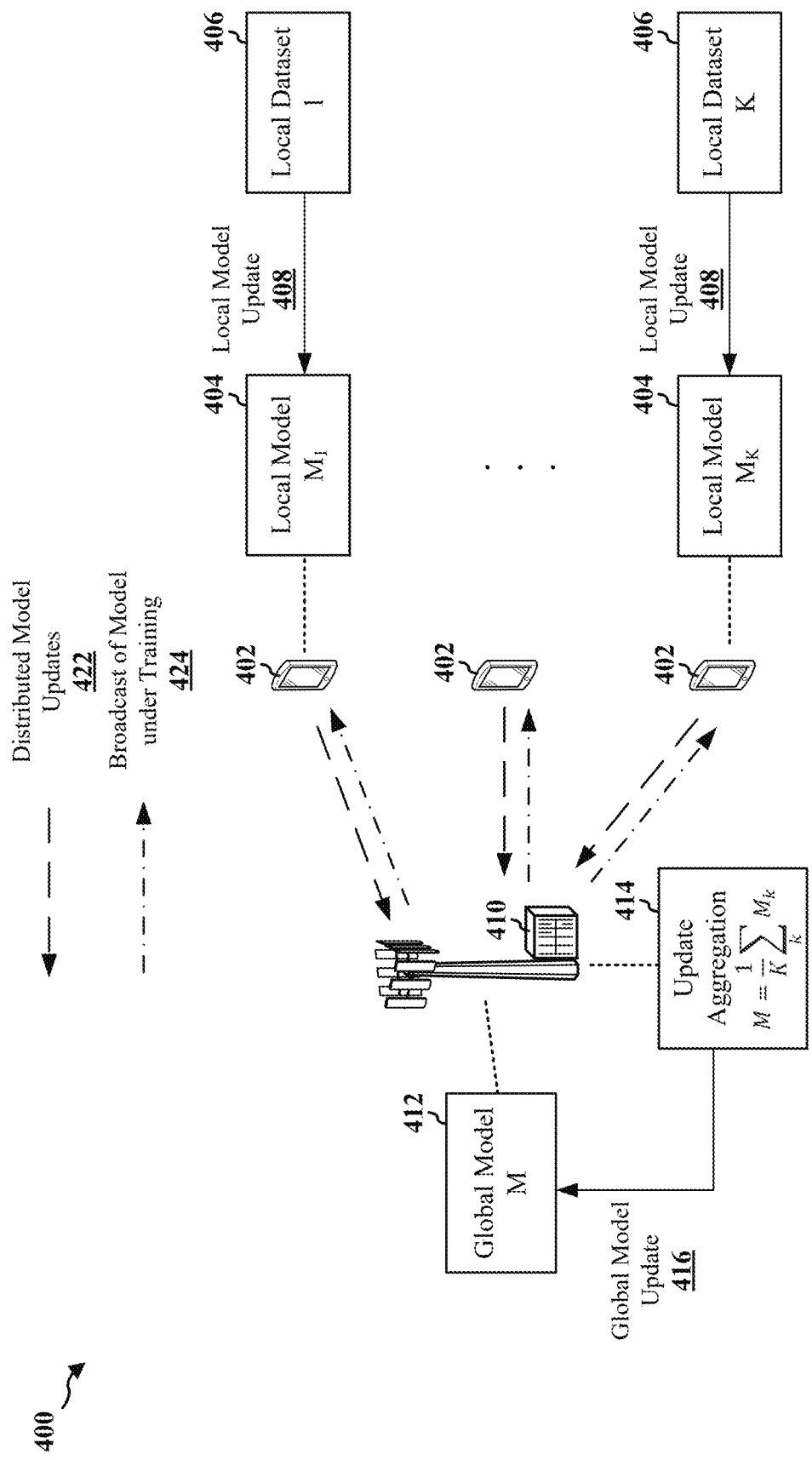
FIG. 4 is a diagram of an example environment associated with federated learning with OTA aggregation according to one or more aspects.

FIG. 4 is a diagram of an example environment 400 associated with federated learning with OTA aggregation according to one or more aspects. The parameter server 410 may correspond to the base station 102/180/310. The edge device 402 may correspond to the UE 104/350. Federated learning is a technique that may enable users (e.g., UEs or edge devices) to train a machine learning model (e.g., a neural network) in a collaborative and distributed fashion using users' local datasets at edge devices (e.g., UEs). Specifically, in each round, a parameter server 410 (e.g., an edge parameter server, such as a base station) may select a number of edge devices 402, and may transmit 424 a copy of the global machine learning model 412 (e.g., the copy may include the parameters of the global machine learning model) to each of the selected edge devices 402. Then, each edge device 402 may obtain 408 updated local model parameters or gradients (or gradient elements) of the machine learning model based on the local copy 404 of the machine learning model (which may be referred to as the local machine learning model hereinafter) that is updated with the local dataset 406 at the edge device 402. Next, each edge device 402 may feed back 422 the corresponding update including the updated local model parameters or the local gradient elements to the parameter server 410. Herein some aspects are described in which the local model update transmitted by the edge device 402 takes the form of gradient elements; however, it should be appreciated that with suitable adaptation of these aspects, the updated local model parameters may be used instead for feeding back the local model update. Thereafter, the parameter server 410 may aggregate 414 all the updates 422 from the edge devices 402, and may update 416 the global machine learning model 412 based on the aggregated updates 422. For the next round, the parameter server 410 may transmit a copy of the updated global machine model 412 to selected edge devices 402, and the edge devices 402 may perform again similar operations as described above. The process may be repeated for a number of times corresponding to a number of rounds until the global machine learning model 412 converges (e.g., until the global model update 416 may no longer produce any changes to the global machine learning model 412).

Federated learning may be associated with the advantage of keeping user data 406 private at edge devices 402 based on the distributed optimization framework (i.e., the user data itself may not be transmitted to the parameter server). On the other hand, communication may be a bottleneck for federated learning. In some examples, federated learning may be performed with digital transmission, where each edge device may transmit its respective update (e.g., gradient elements or updated model parameters) to the parameter server separately from other edge devices over an orthogonal channel (e.g., using OFDMA or TDMA). In some other examples, federated learning may be performed with OTA aggregation, which may be associated with smaller communication overhead than digital transmission because OTA aggregation may allow the edge devices to transmit the updates over the same time-frequency resources on a multiple access channel.

In particular, for OTA aggregation, the edge devices may transmit at the same time and via the same frequency with a common analog waveform. Accordingly, the superimposed analog waveform on the multiple access channel as received by the parameter server, which may be associated with a collision of the analog waveforms from the multiple edge devices, may correspond to a sum of the local updates (e.g., gradient elements or updated model parameters) provided by the edge devices.

The impacts of channels may be important for OTA aggregation associated with federated learning. Ideally, channel inversion (which may be performed, for example, at the RE level) may be performed so that the analog waveform from a particular edge device corresponding to the update may be received at the parameter server (e.g., a base station) at a desired common magnitude regardless of the channel value h associated with the channel between the edge device and the parameter server. However, naïve channel inversion (e.g., brute force channel inversion in order to achieve the desired common magnitude at the receiving parameter server across the entire bandwidth) may not be possible due to the transmission power constraint at the edge device (e.g., a UE), as the channel inversion may significantly increase the transmission power at the edge device, especially for subchannels or subbands with deep fades because a very high transmitter gain may be specified for such subchannels or subbands in order to achieve the ideal channel inversion. Even if perfect channel inversion is possible, the perfect channel inversion may not be desirable from the transmission power utilization point of view.

Therefore, in one or more configurations, an edge device may selectively drop gradient elements or updated local model parameters corresponding to certain REs/subcarriers/RBs/subbands when transmitting a local model update to the parameter server during a round of federated learning. Hereinafter an RE/subcarrier/RB/subband may be referred to as a resource unit. In some examples, dropping gradient elements or updated local model parameters corresponding to a resource unit may include transmitting zero power on that resource unit. In some other examples, dropping gradient elements or updated local model parameters corresponding to a resource unit may also include soft dropping, i.e., transmitting the update on the resource unit using a smaller transmitter gain than would be used for perfect channel inversion.

Figure 5:
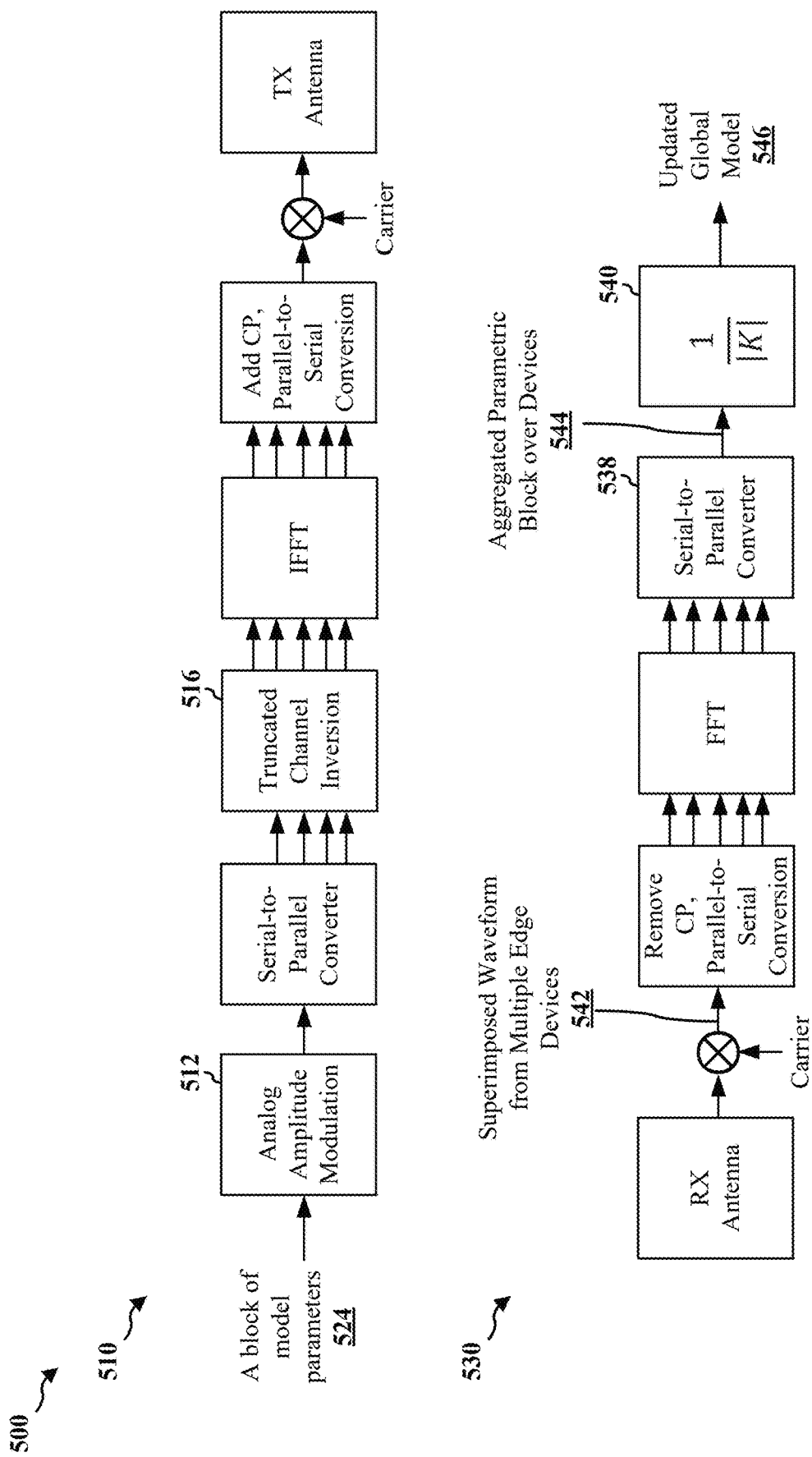
FIG. 5 is a diagram illustrating an example transmitter design for edge devices and an example receiver design for the parameter server according to one or more aspects.

FIG. 5 is a diagram 500 illustrating an example transmitter design for edge devices and an example receiver design for the parameter server according to one or more aspects. In particular, diagram 510 illustrates an example transmitter design for edge devices that may enable OTA aggregation.

The design may differ from a classic OFDM transmitter in that digital modulation (e.g., quadrature amplitude modulation (QAM)) may be replaced with linear analog modulation 512 and channel-inversion power control may be added, which may correspond to a truncated channel inversion block 516. The truncated channel inversion will be explained in further detail below. The signal processing operations in the transmitter as illustrated at 510 may be described as follows. The local model parameters 524 (e.g., updated local model parameters or gradient elements) may first be amplitude-modulated into symbols at 512. The long symbol sequence may be divided into blocks. Each block may be transmitted in a single OFDM symbol with one parameter over one frequency subchannel. Assuming perfect CSI at the transmitter, subchannels may be inverted by power control based on channel inversion so that updates transmitted by different edge devices may be received at the parameter server with identical amplitudes, achieving amplitude alignment at the receiver as specified for OTA aggregation. Nevertheless, a brute force channel inversion approach may be inefficient if not impossible under a power constraint since some subchannels are likely to encounter deep fades. To avoid any exceedingly high transmission power, the truncated channel inversion technique may be used at 516. To be specific, a subchannel may not be inverted if the channel gain of the subchannel is less than a channel gain threshold, and may be allocated zero power (or less power than would be used for perfect channel inversion) instead. Accordingly, the model parameters (e.g., updated local model parameters or gradient elements) that are mapped to such truncated subchannels may be lost (or dropped).

Further, diagram 530 illustrates an example receiver design for the parameter server that may enable OTA aggregation. The receiver for the parameter server may have the same architecture as a conventional OFDM receiver except that the digital demodulator may be replaced with a post-processing operator that may scale the received signal 542 (which may correspond to a superimposed waveform from the multiple edge devices) to obtain the desired average model 546. The received signal 542 may be different between the receiver illustrated in diagram 530 and a conventional design as described below. In an arbitrary federated learning round, a set of edge devices may be scheduled by the parameter server to transmit their local models (e.g., updated local model parameters or gradient elements), which may be represented by the index set K. Given the simultaneous transmission from the edge devices, the parameter server may receive superimposed waveforms 542. The parameter server may obtain the aggregated local model block 544 at the serial-to-parallel converter 538 output. Next, cascading all the blocks and scaling 540 the result by a factor (e.g., the factor may be 1/|K| when the number of training samples is equal among edge devices) may give the desired updated global model 546. Then, if the global model has not converged, the parameter server may initiate the next federated learning round by broadcasting the updated global model 546 to all selected edge devices.

One or more aspects of the disclosure may relate to the criteria used for selecting the local model update elements or resource units associated with the local model update elements for update element dropping. Herein a local model update element may be an update local model parameter or a gradient element. The update element dropping may be referred to as gradient dropping when applied to gradient elements. In one or more examples, dropping some of the local model update elements of a vector may not affect the performance of the federated learning process due to the inherent redundancy in the local model update elements. Therefore, it may be assumed that up to a fraction (e.g., x percent) of local model update elements may be safely dropped without degrading the federated learning performance. In one or more configurations, the selection of local model update elements for update element dropping may be subject to the limit of a fraction ceiling (i.e., an upper fraction limit) associated with the local model update elements selected for update element dropping. In different configurations, the upper fraction limit associated with the local model update elements selected for update element dropping may be task specific, and may change from case to case.

In one or more configurations, an edge device may select some local model update elements for update element dropping based on one or more channel conditions. With some of the local model update elements dropped, a partial channel inversion performed for the remaining local model update elements may be referred to as a truncated channel inversion. In some examples, an edge device (e.g., a UE) may drop the local model update elements corresponding to (e.g., assigned to/mapped to) the resource units that are associated with channel gains less than a preconfigured channel gain threshold. In other words, the edge device may estimate the channel condition between the edge device and the parameter server, and may select the local model update elements associated with poor or weak channel conditions for update element dropping, such that an exceedingly high transmission power associated with the perfect channel inversion may be avoided. In one configuration, the channel gain threshold may be selected by the edge device with or without input from the base station. For example, an edge device may dynamically select the channel gain threshold based on a transmission power budget of the edge device. In another configuration, an edge device may receive, from the network (e.g., a parameter server, such as a base station), an indication of the channel gain threshold. In different configurations, the indication of the channel gain threshold may be in the form of a (scalar) number or a formula for determining the channel gain threshold. Accordingly, if the indication of the channel gain threshold is in the form of a formula for determining the channel gain threshold, the edge device may identify the channel gain threshold based on the formula.

In one or more configurations, an edge device may transmit the update including the local model update elements over multiple spatial layers (e.g., using a MIMO configuration). Accordingly, the rules that the edge device may apply in selecting the local model update elements for update element dropping associated with the truncated channel inversion may be applied to each spatial layer in the multiple spatial layers.

In one or more configurations, an edge device may select some local model update elements for update element dropping based on one or more RF constraints. The RF constraints may include, for example, a PAPR specification, an emission specification, or any other RF condition. For example, if a single carrier transmission is used, it may be desirable or suitable to drop local model update elements associated with an edge RB/RE rather than a center RB/RE if the two RBs/REs are associated with a same channel gain. This may be because dropping local model update elements associated with an edge RB/RE may lead to a lower PAPR. Accordingly, a less amount of update element dropping overall may be performed. In another example, for emission considerations, it may also be desirable or suitable to drop local model update elements associated with an edge RB/RE rather than a center RB/RE.

The resource unit granularity (e.g., the RE level, the subcarrier level, the RB level, or the subband level, etc.) associated with update element dropping may be configured (e.g., autonomously by an edge device/UE or based on a configuration from the parameter server/base station). For example, in one or more configurations, it may be desirable or suitable to drop local model update elements associated with all REs in an RB (e.g., all 12 REs in an RB) rather than drop a same number of REs scattered across multiple RBs.

In one or more configurations, an edge device (e.g., a UE) may report, to the parameter server (e.g., the base station), the identities of the resource units (e.g., REs/subcarriers/RBs/subbands) from which the corresponding local model update elements were dropped. Because ideally the analog waveform from each of the edge devices may be associated with a same uniform amplitude at the receiving parameter server, the parameter server may use the information contained in the report to configure and synchronize the edge devices for the federated learning process.

In one or more configurations, the resource unit granularity used for the report may be the same as or different from the resource unit granularity used for update element dropping. In one example, both the update element dropping and the reporting may be associated with an RE level granularity. In another example, the update element dropping may be performed at an RE level granularity, and the reporting may be associated with a subband granularity in order to reduce the feedback messaging overhead. In other words, the reporting may be associated with a coarser resource unit granularity than the resource unit granularity used for update element dropping.

Figure 6:
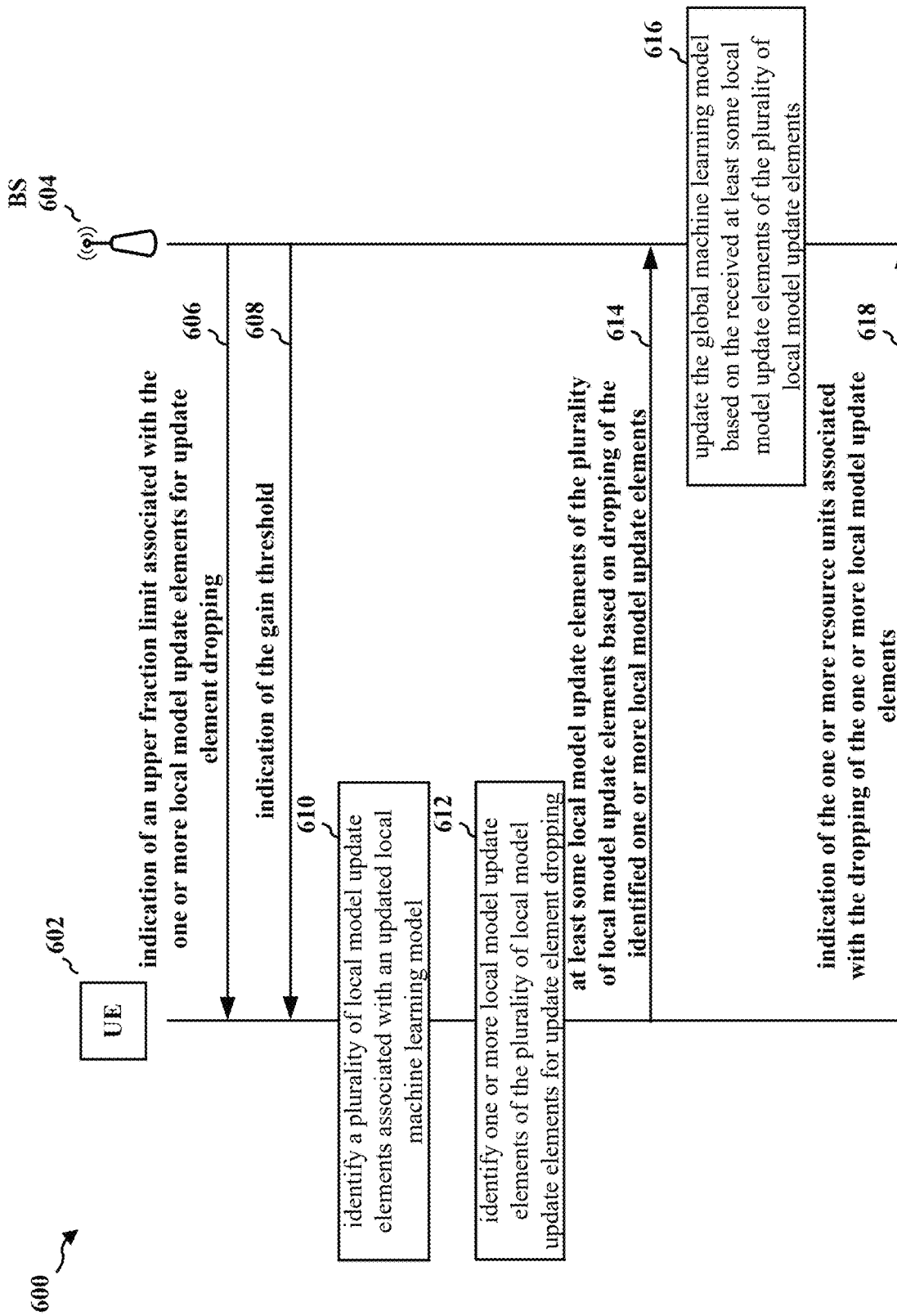
FIG. 6 is a diagram of a communication flow of a method of wireless communication.

FIG. 6 is a diagram of a communication flow 600 of a method of wireless communication. The base station 604 may transmit, to the UE 602, one or more indications of one or more configurations associated with a federated learning process where the OTA aggregation is utilized. For example, at 606, the base station 604 may transmit, to the UE 602, and the UE 602 may receive, from the base station 604, an indication of an upper fraction limit associated with the one or more local model update elements for update element dropping in a plurality of local model update elements. The plurality of local model update elements may include a plurality of gradient elements or a plurality of updated local model parameters.

In another example, at 608, the base station 604 may transmit, to the UE 602, and the UE 602 may receive, from the base station 604, an indication of a channel gain threshold.

In another example (not shown), the base station 604 may transmit, to the UE 602, and the UE 602 may receive, from the base station 604, an indication that the UE 602 may perform update element dropping without further indication from the base station 604.

At 610, the UE 602 may identify the plurality of local model update elements associated with an updated local machine learning model. The updated local machine learning model may have been generated based on a global machine learning model received from the base station 604 and a local dataset at the UE 602.

At 612, the UE 602 may identify one or more local model update elements of the plurality of local model update elements for update element dropping based on at least one of a channel gain, a PAPR specification, an RF emission specification, or an RF condition.

In one configuration, the dropping of the one or more local model update elements may be associated with one or more resource units. Each resource unit in the one or more resource units may be one of an RE, a subcarrier, an RB, or a subband.

In one configuration, the dropping of the one or more local model update elements may be associated with all REs in an RB.

In one configuration, the one or more local model update elements for update element dropping may be identified based on a first channel gain associated with the one or more resource units associated with the identified one or more local model update elements being less than a channel gain threshold. In one configuration, the UE 602 may autonomously identify the channel gain threshold based on a UE transmission power budget associated with the UE 602. In some examples, the UE 602 may autonomously identify the channel gain threshold based on a configuration received from the base station 604. In another configuration, the base station 604 may transmit, to the UE 602, and the UE 602 may receive, from the base station 604, an indication of the channel gain threshold. In different configurations, the indication of the channel gain threshold may correspond to a scalar number or a formula. If the indication of the channel gain threshold corresponds to a formula, the UE 602 may identify the channel gain threshold based on the formula.

In one configuration, the one or more local model update elements for update element dropping may be identified based on at least one of the PAPR specification, the RF emission specification, or the RF condition. In particular, the identified one or more local model update elements may be associated with one or more edge RBs or one or more edge REs.

At 614, the UE 602 may transmit, to the base station 604, and the base station 604 may receive, from the UE 602, over a multiple access channel via analog signaling, at least some local model update elements of the plurality of local model update elements based on dropping of the identified one or more local model update elements. The analog signaling may be associated with OTA aggregation.

In one configuration, a transmission power constraint associated with the UE 602 may be met based on the dropping of the identified one or more local model update elements.

At 616, the base station 604 may update the global machine learning model based on the received at least some local model update elements of the plurality of local model update elements.

At 618, the UE 602 may transmit, to the base station 604, an indication of the one or more resource units associated with the dropping of the identified one or more local model update elements.

In one configuration, the indication of the one or more resource units and the one or more resource units may be associated with a same resource unit granularity. In another configuration, the indication of the one or more resource units may be associated with a coarser resource unit granularity than the one or more resource units.

Figure 7:
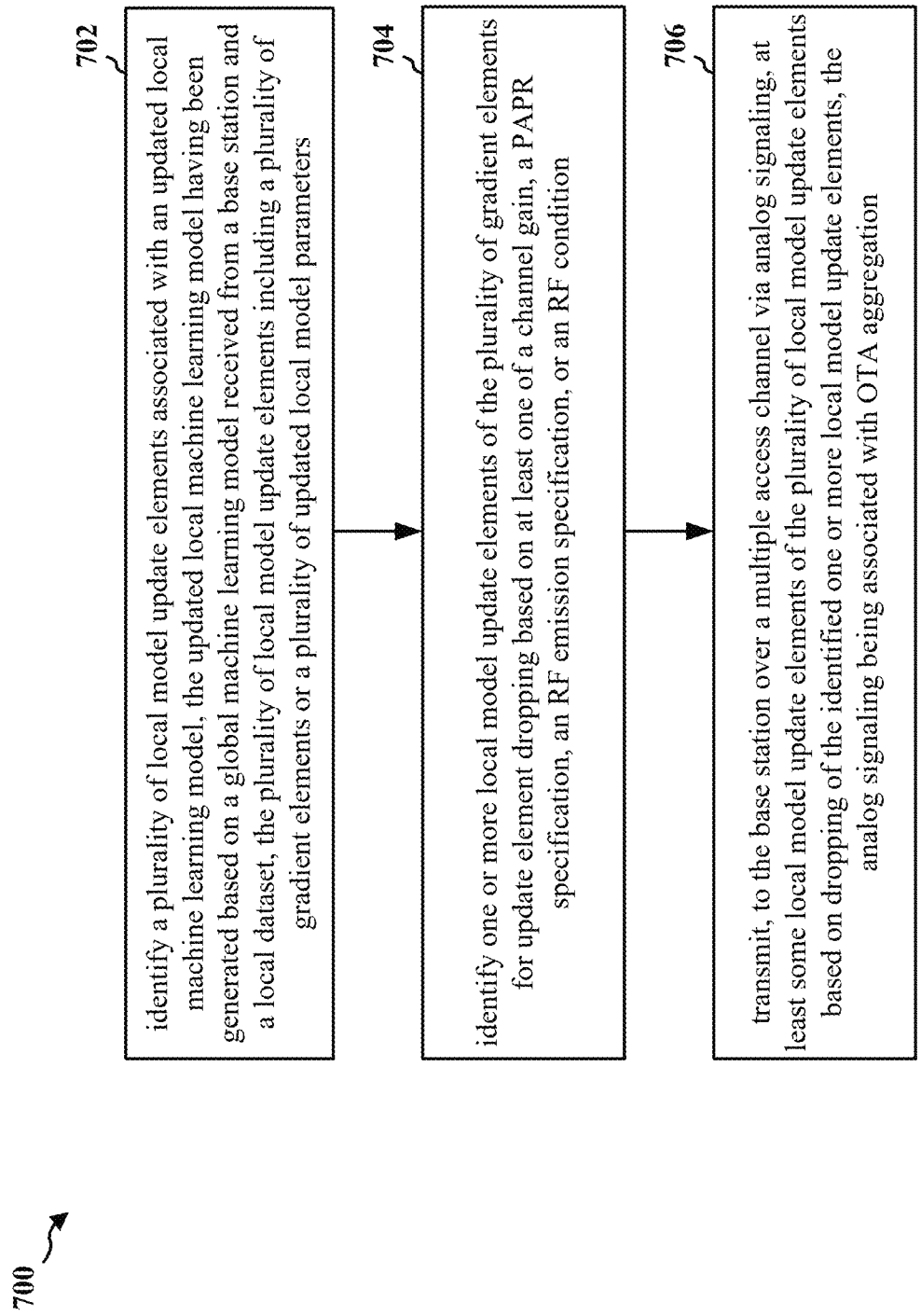
FIG. 7 is a flowchart of a method of wireless communication.

FIG. 7 is a flowchart 700 of a method of wireless communication. The method may be performed by a UE (e.g., the UE 104/350/602; the edge device 402; the apparatus 1102). At 702, the UE may identify a plurality of local model update elements associated with an updated local machine learning model. The updated local machine learning model may have been generated based on a global machine learning model received from a base station and a local dataset. The plurality of local model update elements may include a plurality of gradient elements or a plurality of updated local model parameters. For example, 702 may be performed by the federated learning component 1140 in FIG. 11. Referring to FIG. 6, at 610, the UE 602 may identify a plurality of local model update elements associated with an updated local machine learning model.

At 704, the UE may identify one or more local model update elements of the plurality of local model update elements for update element dropping based on at least one of a channel gain, a PAPR specification, an RF emission specification, or an RF condition. For example, 704 may be performed by the federated learning component 1140 in FIG. 11. Referring to FIG. 6, at 612, the UE 602 may identify one or more local model update elements of the plurality of local model update elements for update element dropping based on at least one of a channel gain, a PAPR specification, an RF emission specification, or an RF condition.

At 706, the UE may transmit, to the base station over a multiple access channel via analog signaling, at least some local model update elements of the plurality of local model update elements based on dropping of the identified one or more local model update elements. The analog signaling may be associated with OTA aggregation. For example, 706 may be performed by the federated learning component 1140 in FIG. 11. Referring to FIG. 6, at 614, the UE 602 may transmit, to the base station 604 over a multiple access channel via analog signaling, at least some local model update elements of the plurality of local model update elements based on dropping of the identified one or more local model update elements.

Figure 8:
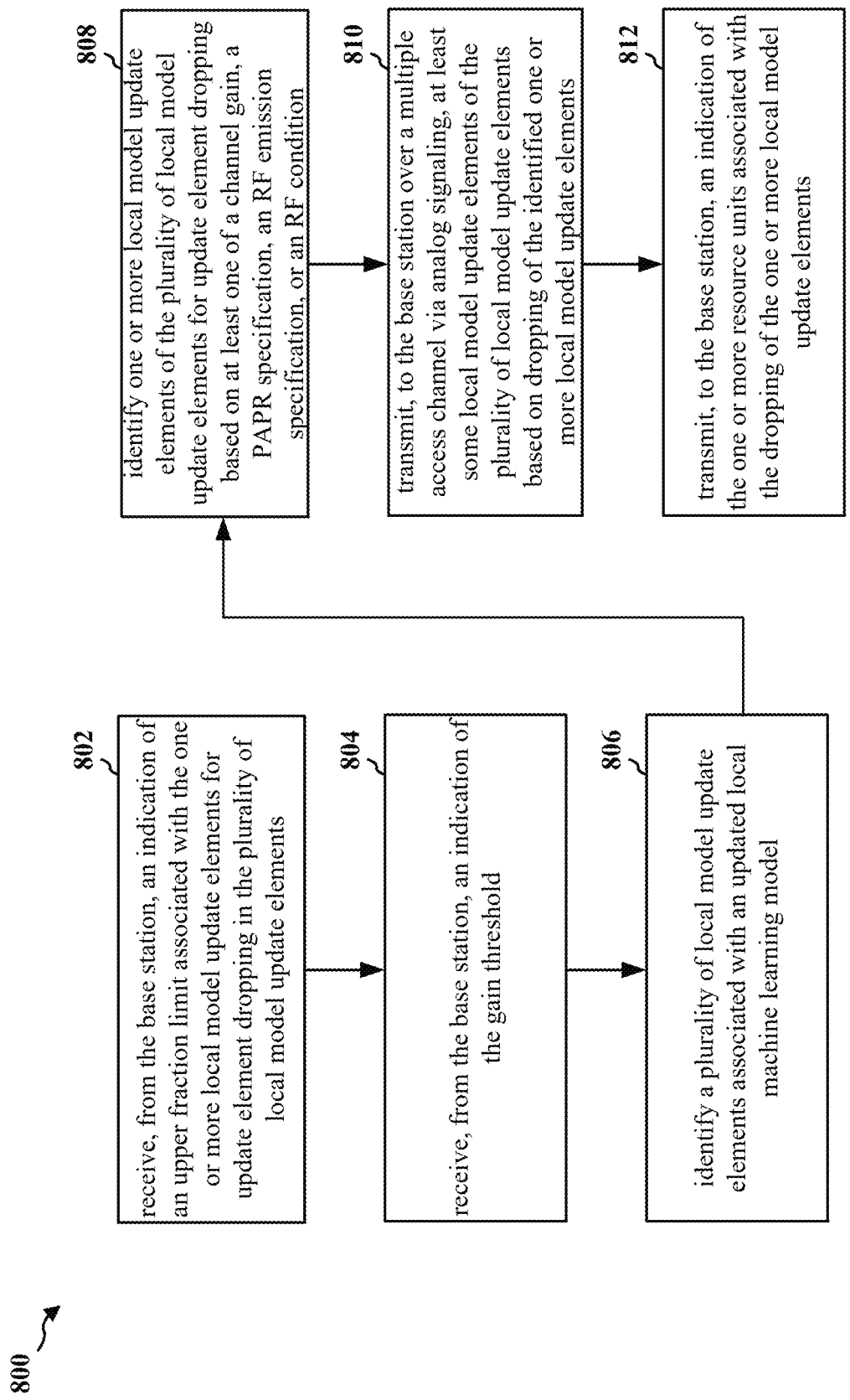
FIG. 8 is a flowchart of a method of wireless communication.

FIG. 8 is a flowchart 800 of a method of wireless communication. The method may be performed by a UE (e.g., the UE 104/350/602; the edge device 402; the apparatus 1102). At 806, the UE may identify a plurality of local model update elements associated with an updated local machine learning model. The updated local machine learning model may have been generated based on a global machine learning model received from a base station and a local dataset. The plurality of local model update elements may include a plurality of gradient elements or a plurality of updated local model parameters. For example, 806 may be performed by the federated learning component 1140 in FIG. 11. Referring to FIG. 6, at 610, the UE 602 may identify a plurality of local model update elements associated with an updated local machine learning model.

At 808, the UE may identify one or more local model update elements of the plurality of local model update elements for update element dropping based on at least one of a channel gain, a PAPR specification, an RF emission specification, or an RF condition. For example, 808 may be performed by the federated learning component 1140 in FIG. 11. Referring to FIG. 6, at 612, the UE 602 may identify one or more local model update elements of the plurality of local model update elements for update element dropping based on at least one of a channel gain, a PAPR specification, an RF emission specification, or an RF condition.

At 810, the UE may transmit, to the base station over a multiple access channel via analog signaling, at least some local model update elements of the plurality of local model update elements based on dropping of the identified one or more local model update elements. The analog signaling may be associated with OTA aggregation. For example, 810 may be performed by the federated learning component 1140 in FIG. 11. Referring to FIG. 6, at 614, the UE 602 may transmit, to the base station 604 over a multiple access channel via analog signaling, at least some local model update elements of the plurality of local model update elements based on dropping of the identified one or more local model update elements.

In one configuration, the dropping of the identified one or more local model update elements may be associated with one or more resource units. Each resource unit in the one or more resource units may be one of an RE, a subcarrier, an RB, or a subband.

In one configuration, at 812, the UE may transmit, to the base station, an indication of the one or more resource units associated with the dropping of the identified one or more local model update elements. For example, 812 may be performed by the federated learning component 1140 in FIG. 11. Referring to FIG. 6, at 618, the UE 602 may transmit, to the base station 604, an indication of the one or more resource units associated with the dropping of the identified one or more local model update elements.

In one configuration, the indication of the one or more resource units and the one or more resource units may be associated with a same resource unit granularity.

In one configuration, the indication of the one or more resource units may be associated with a coarser resource unit granularity than the one or more resource units.

In one configuration, the dropping of the identified one or more local model update elements may be associated with all REs in an RB.

In one configuration, the one or more local model update elements for update element dropping may be identified based on a first channel gain associated with one or more resource units associated with the identified one or more local model update elements being less than a gain threshold.

In one configuration, referring to FIG. 6, the UE 602 may identify the gain threshold based on a UE 602 transmission power budget.

In one configuration, at 804, the UE may receive, from the base station, an indication of the gain threshold. The indication of the gain threshold may correspond to a scalar number or a formula. For example, 804 may be performed by the federated learning component 1140 in FIG. 11. Referring to FIG. 6, at 608, the UE 602 may receive, from the base station 604, an indication of the gain threshold.

In one configuration, the indication of the gain threshold may correspond to the formula. Referring to FIG. 6, the UE 602 may identify the gain threshold based on the formula.

In one configuration, the one or more resource units may be associated with more than one spatial layer associated with a MIMO transmission.

In one configuration, referring to FIG. 6, a transmission power constraint associated with the UE 602 may be met based on the dropping of the identified one or more local model update elements.

In one configuration, the one or more local model update elements for update element dropping may be identified based on at least one of the PAPR specification, the RF emission specification, or the RF condition. The identified one or more local model update elements may be associated with one or more edge RBs or one or more edge REs.

In one configuration, at 802, the UE may receive, from the base station, an indication of an upper fraction limit associated with the one or more local model update elements for update element dropping in the plurality of local model update elements. For example, 802 may be performed by the federated learning component 1140 in FIG. 11. Referring to FIG. 6, at 606, the UE 602 may receive, from the base station 604, an indication of an upper fraction limit associated with the one or more local model update elements for update element dropping in the plurality of local model update elements.

Figure 9:
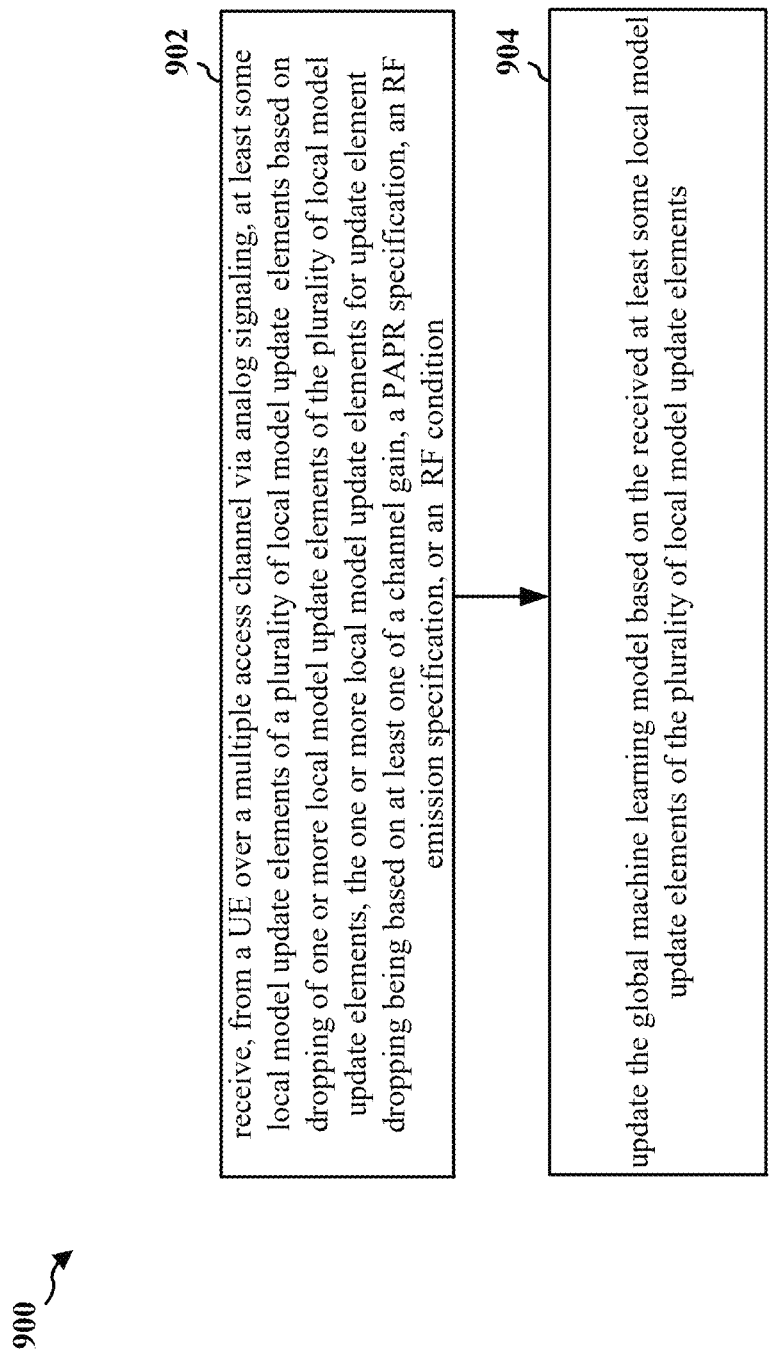
FIG. 9 is a flowchart of a method of wireless communication.

FIG. 9 is a flowchart 900 of a method of wireless communication. The method may be performed by a base station (e.g., the base station 102/180/310/604; the parameter server 410; the apparatus 1202). At 902, the base station may receive, from a UE over a multiple access channel via analog signaling, at least some local model update elements of a plurality of local model update elements based on dropping of one or more local model update elements of the plurality of local model update elements. The plurality of local model update elements may be associated with an updated local machine learning model at the UE. The updated local machine learning model may be based on a global machine learning model from the base station and a local dataset at the UE. The plurality of local model update elements may include a plurality of gradient elements or a plurality of updated local model parameters. The one or more local model update elements for update element dropping may be based on at least one of a channel gain, a PAPR specification, an RF emission specification, or an RF condition. The analog signaling may be associated with OTA aggregation. For example, 902 may be performed by the federated learning component 1240 in FIG. 12. Referring to FIG. 6, at 614, the base station 604 may receive, from a UE 602 over a multiple access channel via analog signaling, at least some local model update elements of a plurality of local model update elements based on dropping of one or more local model update elements of the plurality of local model update elements.

At 904, the base station may update the global machine learning model based on the received at least some local model update elements of the plurality of local model update elements. For example, 904 may be performed by the federated learning component 1240 in FIG. 12. Referring to FIG. 6, at 616, the base station 604 may update the global machine learning model based on the received at least some local model update elements of the plurality of local model update elements.

Figure 10:
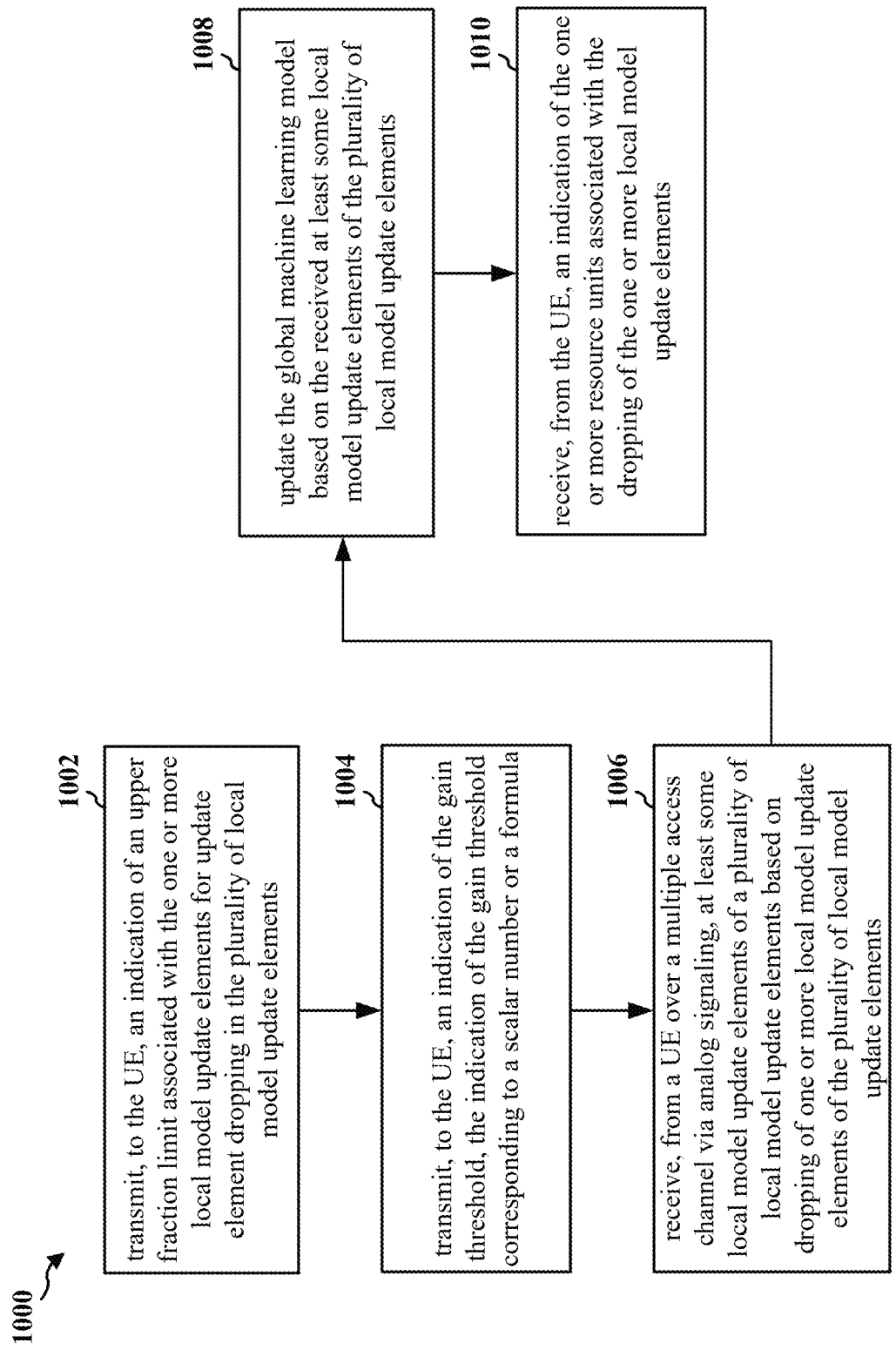
FIG. 10 is a flowchart of a method of wireless communication.

FIG. 10 is a flowchart 1000 of a method of wireless communication. The method may be performed by a base station (e.g., the base station 102/180/310/604; the parameter server 410; the apparatus 1202). At 1006, the base station may receive, from a UE over a multiple access channel via analog signaling, at least some local model update elements of a plurality of local model update elements based on dropping of one or more local model update elements of the plurality of local model update elements. The plurality of local model update elements may be associated with an updated local machine learning model at the UE. The updated local machine learning model may be based on a global machine learning model from the base station and a local dataset at the UE. The plurality of local model update elements may include a plurality of gradient elements or a plurality of updated local model parameters. The one or more local model update elements for update element dropping may be based on at least one of a channel gain, a PAPR specification, an RF emission specification, or an RF condition. The analog signaling may be associated with OTA aggregation. For example, 1006 may be performed by the federated learning component 1240 in FIG. 12. Referring to FIG. 6, at 614, the base station 604 may receive, from a UE 602 over a multiple access channel via analog signaling, at least some local model update elements of a plurality of local model update elements based on dropping of one or more local model update elements of the plurality of local model update elements.

At 1008, the base station may update the global machine learning model based on the received at least some local model update elements of the plurality of local model update elements. For example, 1008 may be performed by the federated learning component 1240 in FIG. 12. Referring to FIG. 6, at 616, the base station 604 may update the global machine learning model based on the received at least some local model update elements of the plurality of local model update elements.

In one configuration, the dropping of the one or more local model update elements may be associated with one or more resource units. Each resource unit in the one or more resource units may be one of an RE, a subcarrier, an RB, or a subband.

In one configuration, at 1010, the base station may receive, from the UE, an indication of the one or more resource units associated with the dropping of the one or more local model update elements. For example, 1010 may be performed by the federated learning component 1240 in FIG. 12. Referring to FIG. 6, at 618, the base station 604 may receive, from the UE 602, an indication of the one or more resource units associated with the dropping of the one or more local model update elements.

In one configuration, the indication of the one or more resource units and the one or more resource units may be associated with a same resource unit granularity.

In one configuration, the indication of the one or more resource units may be associated with a coarser resource unit granularity than the one or more resource units.

In one configuration, the dropping of the one or more local model update elements may be associated with all REs in an RB.

In one configuration, the one or more local model update elements for update element dropping may be based on a first channel gain associated with one or more resource units associated with the one or more local model update elements being less than a gain threshold.

In one configuration, the gain threshold may be based on a UE transmission power budget.

In one configuration, at 1004, the base station may transmit, to the UE, an indication of the gain threshold. The indication of the gain threshold may correspond to a scalar number or a formula. For example, 1004 may be performed by the federated learning component 1240 in FIG. 12. Referring to FIG. 6, at 608, the base station 604 may transmit, to the UE 602, an indication of the gain threshold.

In one configuration, the one or more resource units may be associated with more than one spatial layer associated with a MIMO transmission.

In one configuration, the one or more local model update elements for update element dropping may be based on at least one of the PAPR specification, the RF emission specification, or the RF condition. The one or more local model update elements may be associated with one or more edge RBs or one or more edge REs.

In one configuration, at 1002, the base station may transmit, to the UE, an indication of an upper fraction limit associated with the one or more local model update elements for update element dropping in the plurality of local model update elements. For example, 1002 may be performed by the federated learning component 1240 in FIG. 12. Referring to FIG. 6, at 606, the base station 604 may transmit, to the UE 602, an indication of an upper fraction limit associated with the one or more local model update elements for update element dropping in the plurality of local model update elements.

Figure 11:
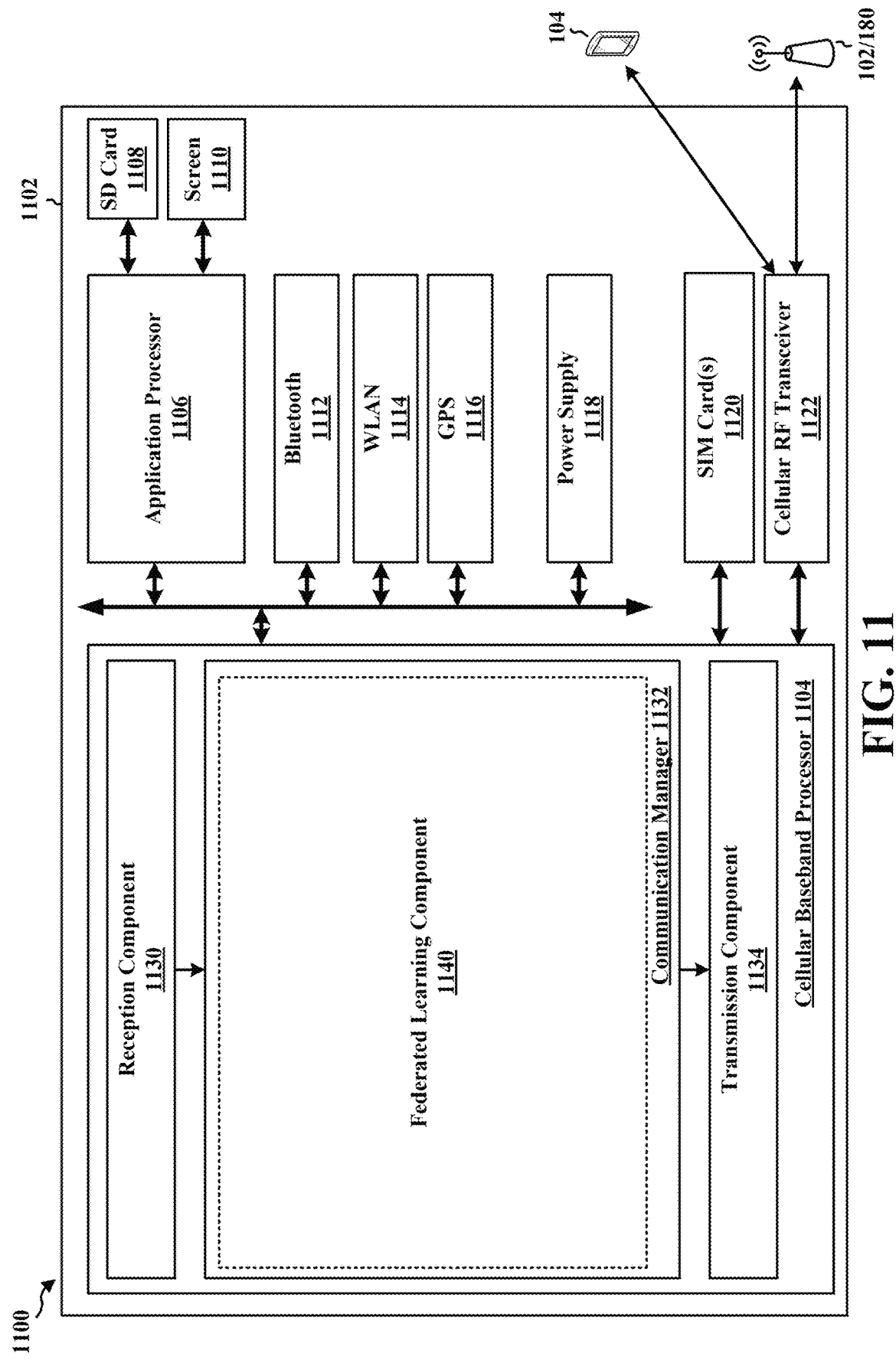
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a federated learning component 1140 that may be configured to receive, from the base station, an indication of an upper fraction limit associated with the one or more local model update elements for update element dropping in the plurality of local model update elements, e.g., as described in connection with 802 in FIG. 8. The federated learning component 1140 may be configured to receive, from the base station, an indication of the gain threshold, e.g., as described in connection with 804 in FIG. 8. The federated learning component 1140 may be configured to identify a plurality of local model update elements associated with an updated local machine learning model, e.g., as described in connection with 702 in FIGS. 7 and 806 in FIG. 8. The federated learning component 1140 may be configured to identify one or more local model update elements of the plurality of local model update elements for update element dropping based on at least one of a channel gain, a PAPR specification, an RF emission specification, or an RF condition, e.g., as described in connection with 704 in FIGS. 7 and 808 in FIG. 8. The federated learning component 1140 may be configured to transmit, to the base station over a multiple access channel via analog signaling, at least some local model update elements of the plurality of local model update elements based on dropping of the identified one or more local model update elements, e.g., as described in connection with 706 in FIGS. 7 and 810 in FIG. 8. The federated learning component 1140 may be configured to transmit, to the base station, an indication of the one or more resource units associated with the dropping of the identified one or more local model update elements, e.g., as described in connection with 812 in FIG. 8.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for identifying a plurality of local model update elements associated with an updated local machine learning model. The updated local machine learning model may have been generated based on a global machine learning model received from a base station and a local dataset. The plurality of local model update elements may include a plurality of gradient elements or a plurality of updated local model parameters. The apparatus 1102, and in particular the cellular baseband processor 1104, includes means for identifying one or more local model update elements of the plurality of local model update elements for update element dropping based on at least one of a channel gain, a PAPR specification, an RF emission specification, or an RF condition. The apparatus 1102, and in particular the cellular baseband processor 1104, includes means for transmitting, to the base station over a multiple access channel via analog signaling, at least some local model update elements of the plurality of local model update elements based on dropping of the identified one or more local model update elements. The analog signaling may be associated with OTA aggregation.

In one configuration, the dropping of the identified one or more local model update elements may be associated with one or more resource units. Each resource unit in the one or more resource units may be one of an RE, a subcarrier, an RB, or a subband. In one configuration, the apparatus 1102, and in particular the cellular baseband processor 1104, includes means for transmitting, to the base station, an indication of the one or more resource units associated with the dropping of the identified one or more local model update elements. In one configuration, the indication of the one or more resource units and the one or more resource units may be associated with a same resource unit granularity. In one configuration, the indication of the one or more resource units may be associated with a coarser resource unit granularity than the one or more resource units. In one configuration, the dropping of the identified one or more local model update elements may be associated with all REs in an RB. In one configuration, the one or more local model update elements for update element dropping may be identified based on a first channel gain associated with one or more resource units associated with the identified one or more local model update elements being less than a gain threshold. In one configuration, the UE may identify the gain threshold based on a UE transmission power budget. In one configuration, the apparatus 1102, and in particular the cellular baseband processor 1104, includes means for receiving, from the base station, an indication of the gain threshold. The indication of the gain threshold may correspond to a scalar number or a formula. In one configuration, the indication of the gain threshold may correspond to the formula. The UE may identify the gain threshold based on the formula. In one configuration, the one or more resource units may be associated with more than one spatial layer associated with a MIMO transmission. In one configuration, a transmission power constraint associated with the UE may be met based on the dropping of the identified one or more local model update elements. In one configuration, the one or more local model update elements for update element dropping may be identified based on at least one of the PAPR specification, the RF emission specification, or the RF condition. The identified one or more local model update elements may be associated with one or more edge RBs or one or more edge REs. In one configuration, the apparatus 1102, and in particular the cellular baseband processor 1104, includes means for receiving, from the base station, an indication of an upper fraction limit associated with the one or more local model update elements for update element dropping in the plurality of local model update elements.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
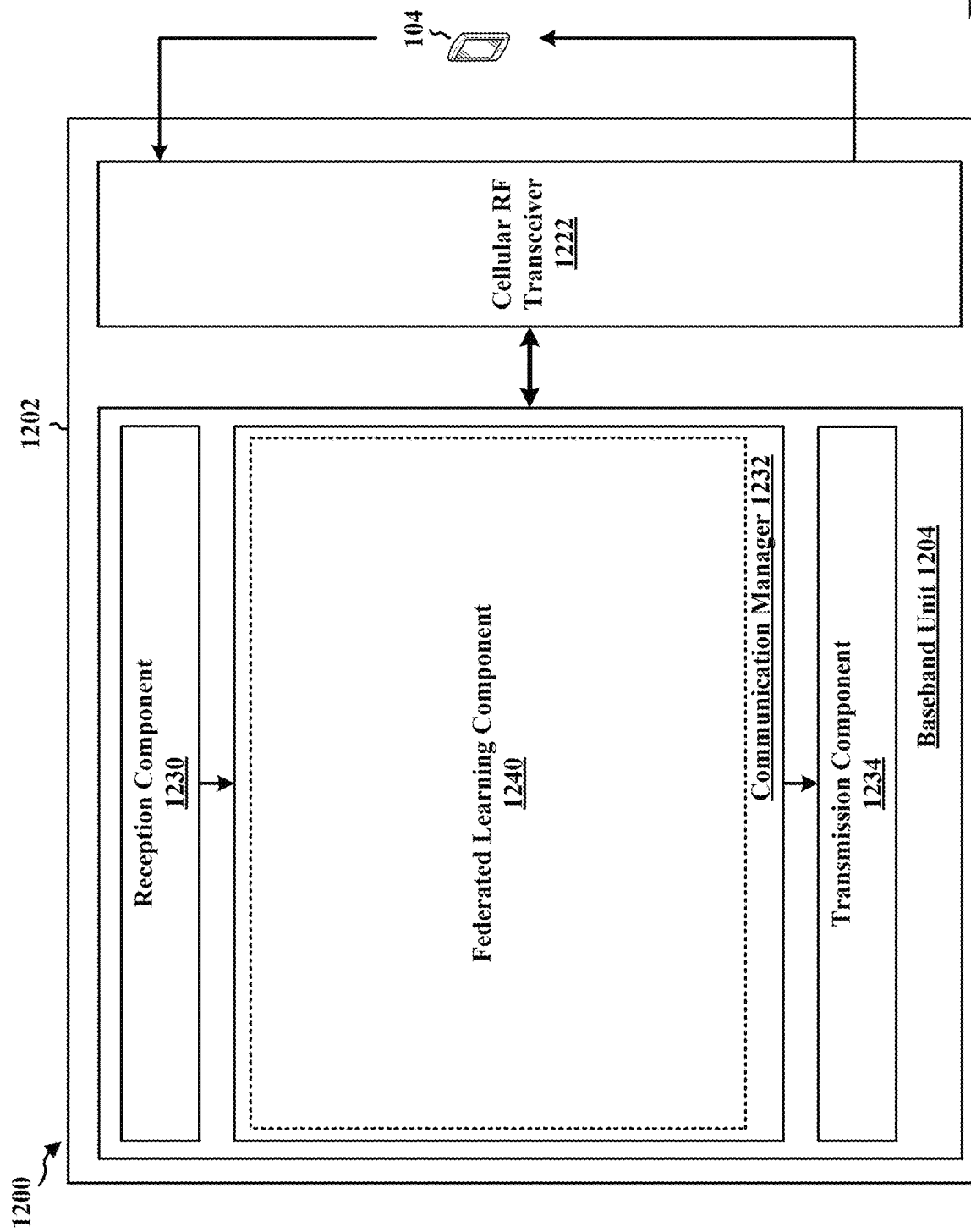
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a federated learning component 1240 that may be configured to transmit, to the UE, an indication of an upper fraction limit associated with the one or more local model update elements for update element dropping in the plurality of local model update elements, e.g., as described in connection with 1002 in FIG. 10. The federated learning component 1240 may be configured to transmit, to the UE, an indication of the gain threshold, e.g., as described in connection with 1004 in FIG. 10. The federated learning component 1240 may be configured to receive, from a UE over a multiple access channel via analog signaling, at least some local model update elements of a plurality of local model update elements based on dropping of one or more local model update elements of the plurality of local model update elements, e.g., as described in connection with 902 in FIGS. 9 and 1006 in FIG. 10. The federated learning component 1240 may be configured to update the global machine learning model based on the received at least some local model update elements of the plurality of local model update elements, e.g., as described in connection with 904 in FIGS. 9 and 1008 in FIG. 10. The federated learning component 1240 may be configured to receive, from the UE, an indication of the one or more resource units associated with the dropping of the one or more local model update elements, e.g., as described in connection with 1010 in FIG. 10.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for receiving, from a UE over a multiple access channel via analog signaling, at least some local model update elements of a plurality of local model update elements based on dropping of one or more local model update elements of the plurality of local model update elements. The plurality of local model update elements may be associated with an updated local machine learning model at the UE. The updated local machine learning model may be based on a global machine learning model from the base station and a local dataset at the UE. The plurality of local model update elements may include a plurality of gradient elements or a plurality of updated local model parameters. The one or more local model update elements for update element dropping may be based on at least one of a channel gain, a PAPR specification, an RF emission specification, or an RF condition. The analog signaling may be associated with OTA aggregation. The apparatus 1202, and in particular the baseband unit 1204, includes means for updating the global machine learning model based on the received at least some local model update elements of the plurality of local model update elements.

In one configuration, the dropping of the one or more local model update elements may be associated with one or more resource units. Each resource unit in the one or more resource units may be one of an RE, a subcarrier, an RB, or a subband. In one configuration, the apparatus 1202, and in particular the baseband unit 1204, includes means for receiving, from the UE, an indication of the one or more resource units associated with the dropping of the one or more local model update elements. In one configuration, the indication of the one or more resource units and the one or more resource units may be associated with a same resource unit granularity. In one configuration, the indication of the one or more resource units may be associated with a coarser resource unit granularity than the one or more resource units. In one configuration, the dropping of the one or more local model update elements may be associated with all REs in an RB. In one configuration, the one or more local model update elements for update element dropping may be based on a first channel gain associated with one or more resource units associated with the one or more local model update elements being less than a gain threshold. In one configuration, the gain threshold may be based on a UE transmission power budget. In one configuration, the apparatus 1202, and in particular the baseband unit 1204, includes means for transmitting, to the UE, an indication of the gain threshold. In one configuration, the one or more resource units may be associated with more than one spatial layer associated with a MIMO transmission. In one configuration, the one or more local model update elements for update element dropping may be based on at least one of the PAPR specification, the RF emission specification, or the RF condition. The one or more local model update elements may be associated with one or more edge RBs or one or more edge REs. In one configuration, the apparatus 1202, and in particular the baseband unit 1204, includes means for transmitting, to the UE, an indication of an upper fraction limit associated with the one or more local model update elements for update element dropping in the plurality of local model update elements.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 4-12, a UE may identify a plurality of local model update elements associated with an updated local machine learning model. The updated local machine learning model may have been generated based on a global machine learning model received from a base station and a local dataset. The plurality of local model update elements may include a plurality of gradient elements or a plurality of updated local model parameters. The UE may identify one or more local model update elements of the plurality of local model update elements for update element dropping based on at least one of a channel gain, a PAPR specification, an RF emission specification, or an RF condition. The UE may transmit, to the base station, and the base station may receive, from the UE over a multiple access channel via analog signaling, at least some local model update elements of the plurality of local model update elements based on dropping of the identified one or more local model update elements. The analog signaling may be associated with OTA aggregation. The base station may update the global machine learning model based on the received at least some local model update elements of the plurality of local model update elements. Accordingly, federated learning with OTA aggregation may be performed. An edge device/UE may drop some local model update elements and perform truncated channel inversion when reporting the updated local model to the parameter server/base station, in order to avoid any exceedingly high transmission power at the edge device/UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to identify a plurality of local model update elements associated with an updated local machine learning model, the updated local machine learning model having been generated based on a global machine learning model received from a base station and a local dataset, the plurality of local model update elements including a plurality of gradient elements or a plurality of updated local model parameters; identify one or more local model update elements of the plurality of local model update elements for update element dropping based on at least one of a channel gain, a PAPR specification, an RF emission specification, or an RF condition; and transmit, to the base station over a multiple access channel via analog signaling, at least some local model update elements of the plurality of local model update elements based on dropping of the identified one or more local model update elements, the analog signaling being associated with OTA aggregation.

Aspect 2 is the apparatus of aspect 1, where the dropping of the identified one or more local model update elements is associated with one or more resource units, and each resource unit in the one or more resource units is one of an RE, a subcarrier, an RB, or a subband.

Aspect 3 is the apparatus of aspect 2, the at least one processor being further configured to: transmit, to the base station, an indication of the one or more resource units associated with the dropping of the identified one or more local model update elements.

Aspect 4 is the apparatus of aspect 3, where the indication and the one or more resource units are associated with a same resource unit granularity.

Aspect 5 is the apparatus of aspect 3, where the indication is associated with a coarser resource unit granularity than the one or more resource units.

Aspect 6 is the apparatus of any of aspects 1 to 5, where the dropping of the identified one or more local model update elements is associated with all REs in an RB.

Aspect 7 is the apparatus of any of aspects 1 to 6, where the one or more local model update elements for update element dropping are identified based on a first channel gain associated with one or more resource units associated with the identified one or more local model update elements being less than a gain threshold.

Aspect 8 is the apparatus of aspect 7, the at least one processor being further configured to: identify the gain threshold based on a UE transmission power budget.

Aspect 9 is the apparatus of aspect 7, the at least one processor being further configured to: receive, from the base station, an indication of the gain threshold, the indication of the gain threshold corresponding to a scalar number or a formula.

Aspect 10 is the apparatus of aspect 9, where the indication of the gain threshold corresponds to the formula, and the at least one processor is further configured to identify the gain threshold based on the formula.

Aspect 11 is the apparatus of any of aspects 7 to 10, where the one or more resource units are associated with more than one spatial layer associated with a MIMO transmission.

Aspect 12 is the apparatus of any of aspects 7 to 11, where a transmission power constraint associated with the UE is met based on the dropping of the identified one or more local model update elements.

Aspect 13 is the apparatus of any of aspects 1 to 12, where the one or more local model update elements for update element dropping are identified based on at least one of the PAPR specification, the RF emission specification, or the RF condition, and the identified one or more local model update elements are associated with one or more edge RBs or one or more edge REs.

Aspect 14 is the apparatus of any of aspects 1 to 13, the at least one processor being further configured to: receive, from the base station, an indication of an upper fraction limit associated with the one or more local model update elements for update element dropping in the plurality of local model update elements.

Aspect 15 is the apparatus of any of aspects 1 to 14, further including a transceiver coupled to the at least one processor.

Aspect 16 is an apparatus for wireless communication at a base station including at least one processor coupled to a memory and configured to receive, from a UE over a multiple access channel via analog signaling, at least some local model update elements of a plurality of local model update elements based on dropping of one or more local model update elements of the plurality of local model update elements, the plurality of local model update elements being associated with an updated local machine learning model at the UE, the updated local machine learning model being based on a global machine learning model from the base station and a local dataset at the UE, the plurality of local model update elements including a plurality of gradient elements or a plurality of updated local model parameters, the one or more local model update elements for update element dropping being based on at least one of a channel gain, a PAPR specification, an RF emission specification, or an RF condition, the analog signaling being associated with OTA aggregation; and update the global machine learning model based on the received at least some local model update elements of the plurality of local model update elements.

Aspect 17 is the apparatus of aspect 16, where the dropping of the one or more local model update elements is associated with one or more resource units, and each resource unit in the one or more resource units is one of an RE, a subcarrier, an RB, or a subband.

Aspect 18 is the apparatus of aspect 17, the at least one processor being further configured to: receive, from the UE, an indication of the one or more resource units associated with the dropping of the one or more local model update elements.

Aspect 19 is the apparatus of aspect 18, where the indication and the one or more resource units are associated with a same resource unit granularity.

Aspect 20 is the apparatus of aspect 18, where the indication is associated with a coarser resource unit granularity than the one or more resource units.

Aspect 21 is the apparatus of any of aspects 16 to 20, where the dropping of the one or more local model update elements is associated with all REs in an RB.

Aspect 22 is the apparatus of any of aspects 16 to 21, where the one or more local model update elements for update element dropping are based on a first channel gain associated with one or more resource units associated with the one or more local model update elements being less than a gain threshold.

Aspect 23 is the apparatus of aspect 22, where the gain threshold is based on a UE transmission power budget.

Aspect 24 is the apparatus of aspect 22, the at least one processor being further configured to: transmit, to the UE, an indication of the gain threshold, the indication of the gain threshold corresponding to a scalar number or a formula.

Aspect 25 is the apparatus of any of aspects 22 to 24, where the one or more resource units are associated with more than one spatial layer associated with a MIMO transmission.

Aspect 26 is the apparatus of any of aspects 16 to 25, where the one or more local model update elements for update element dropping are based on at least one of the PAPR specification, the RF emission specification, or the RF condition, and the one or more local model update elements are associated with one or more edge RBs or one or more edge REs.

Aspect 27 is the apparatus of any of aspects 16 to 26, the at least one processor being further configured to: transmit, to the UE, an indication of an upper fraction limit associated with the one or more local model update elements for update element dropping in the plurality of local model update elements.

Aspect 28 is the apparatus of any of aspects 16 to 27, further including a transceiver coupled to the at least one processor.

Aspect 29 is a method of wireless communication for implementing any of aspects 1 to 28.

Aspect 30 is an apparatus for wireless communication including means for implementing any of aspects 1 to 28.

Aspect 31 is a computer-readable medium storing computer executable code, where the code when executed by a processor causes the processor to implement any of aspects 1 to 28.

What is claimed is:

1. An apparatus for wireless communication at a user equipment (UE), comprising:
a memory; and
at least one processor coupled to the memory and configured to:
identify a plurality of local model update elements associated with an updated local machine learning model, the updated local machine learning model having been generated based on a global machine learning model received from a base station and a local dataset, the plurality of local model update elements including a plurality of gradient elements or a plurality of updated local model parameters;
identify one or more local model update elements of the plurality of local model update elements for update element dropping based on at least one of a channel gain, a peak-to-average-power ratio (PAPR) specification, a radio frequency (RF) emission specification, or an RF condition; and
transmit, to the base station over a multiple access channel via analog signaling, at least some local model update elements of the plurality of local model update elements based on dropping of the identified one or more local model update elements, the analog signaling being associated with over-the-air (OTA) aggregation.

2. The apparatus of claim 1, wherein the dropping of the identified one or more local model update elements is associated with one or more resource units, and each resource unit in the one or more resource units is one of a resource element (RE), a subcarrier, a resource block (RB), or a subband.

3. The apparatus of claim 2, the at least one processor being further configured to:
transmit, to the base station, an indication of the one or more resource units associated with the dropping of the identified one or more local model update elements.

4. The apparatus of claim 3, wherein the indication and the one or more resource units are associated with a same resource unit granularity.

5. The apparatus of claim 3, wherein the indication is associated with a coarser resource unit granularity than the one or more resource units.

6. The apparatus of claim 1, wherein the dropping of the identified one or more local model update elements is associated with all resource elements (REs) in a resource block (RB).

7. The apparatus of claim 1, wherein the one or more local model update elements for update element dropping are identified based on a first channel gain associated with one or more resource units associated with the identified one or more local model update elements being less than a channel gain threshold.

8. The apparatus of claim 7, the at least one processor being further configured to:
identify the channel gain threshold based on a UE transmission power budget.

9. The apparatus of claim 7, the at least one processor being further configured to:
receive, from the base station, an indication of the channel gain threshold, the indication of the channel gain threshold corresponding to a scalar number or a formula.

10. The apparatus of claim 9, wherein the indication of the channel gain threshold corresponds to the formula, and the at least one processor is further configured to identify the channel gain threshold based on the formula.

11. The apparatus of claim 7, wherein the one or more resource units are associated with more than one spatial layer associated with a multiple-input-multiple-output (MIMO) transmission.

12. The apparatus of claim 7, wherein a transmission power constraint associated with the UE is met based on the dropping of the identified one or more local model update elements.

13. The apparatus of claim 1, wherein the one or more local model update elements for update element dropping are identified based on at least one of the PAPR specification, the RF emission specification, or the RF condition, and the identified one or more local model update elements are associated with one or more edge resource blocks (RBs) or one or more edge resource elements (REs).

14. The apparatus of claim 1, further comprising a transceiver coupled to the at least one processor, the at least one processor being further configured to:
receive, from the base station, an indication of an upper fraction limit associated with the one or more local model update elements for update element dropping in the plurality of local model update elements.

15. A method of wireless communication at a user equipment (UE), comprising:
identifying a plurality of local model update elements associated with an updated local machine learning model, the updated local machine learning model having been generated based on a global machine learning model received from a base station and a local dataset, the plurality of local model update elements including a plurality of gradient elements or a plurality of updated local model parameters;
identifying one or more local model update elements of the plurality of local model update elements for update element dropping based on at least one of a channel gain, a peak-to-average-power ratio (PAPR) specification, a radio frequency (RF) emission specification, or an RF condition; and
transmit, to the base station over a multiple access channel via analog signaling, at least some local model update elements of the plurality of local model update elements based on dropping of the identified one or more local model update elements, the analog signaling being associated with over-the-air (OTA) aggregation.

16. An apparatus for wireless communication at a base station, comprising:
a memory; and
at least one processor coupled to the memory and configured to:

receive, from a user equipment (UE) over a multiple access channel via analog signaling, at least some local model update elements of a plurality of local model update elements based on dropping of one or more local model update elements of the plurality of local model update elements, the plurality of local model update elements being associated with an updated local machine learning model at the UE, the updated local machine learning model being based on a global machine learning model from the base station and a local dataset at the UE, the plurality of local model update elements including a plurality of gradient elements or a plurality of updated local model parameters, the one or more local model update elements for update element dropping being based on at least one of a channel gain, a peak-to-average-power ratio (PAPR) specification, a radio frequency (RF) emission specification, or an RF condition, the analog signaling being associated with over-the-air (OTA) aggregation; and update the global machine learning model based on the received at least some local model update elements of the plurality of local model update elements.

17. The apparatus of claim 16, wherein the dropping of the one or more local model update elements is associated with one or more resource units, and each resource unit in the one or more resource units is one of a resource element (RE), a subcarrier, a resource block (RB), or a subband.

18. The apparatus of claim 17, the at least one processor being further configured to:
receive, from the UE, an indication of the one or more resource units associated with the dropping of the one or more local model update elements.

19. The apparatus of claim 18, wherein the indication and the one or more resource units are associated with a same resource unit granularity.

20. The apparatus of claim 18, wherein the indication is associated with a coarser resource unit granularity than the one or more resource units.

21. The apparatus of claim 16, wherein the dropping of the one or more local model update elements is associated with all resource elements (REs) in a resource block (RB).

22. The apparatus of claim 16, wherein the one or more local model update elements for update element dropping are based on a first channel gain associated with one or more resource units associated with the one or more local model update elements being less than a channel gain threshold.

23. The apparatus of claim 22, wherein the channel gain threshold is based on a UE transmission power budget.

24. The apparatus of claim 22, the at least one processor being further configured to:

transmit, to the UE, an indication of the channel gain threshold, the indication of the channel gain threshold corresponding to a scalar number or a formula.

25. The apparatus of claim 22, wherein the one or more resource units are associated with more than one spatial layer associated with a multiple-input-multiple-output (MIMO) transmission.

26. The apparatus of claim 16, wherein the one or more local model update elements for update element dropping are based on at least one of the PAPR specification, the RF emission specification, or the RF condition, and the one or more local model update elements are associated with one or more edge resource blocks (RBs) or one or more edge resource elements (REs).

27. The apparatus of claim 16, the at least one processor being further configured to:
transmit, to the UE, an indication of an upper fraction limit associated with the one or more local model update elements for update element dropping in the plurality of local model update elements.

28. The apparatus of claim 16, further comprising a transceiver coupled to the at least one processor.

29. A method of wireless communication at a base station, comprising:
receiving, from a user equipment (UE) over a multiple access channel via analog signaling, at least some local model update elements of a plurality of local model update elements based on dropping of one or more local model update elements of the plurality of local model update elements, the plurality of local model update elements being associated with an updated local machine learning model at the UE, the updated local machine learning model being based on a global machine learning model from the base station and a local dataset at the UE, the plurality of local model update elements including a plurality of gradient elements or a plurality of updated local model parameters, the one or more local model update elements for update element dropping being based on at least one of a channel gain, a peak-to-average-power ratio (PAPR) specification, a radio frequency (RF) emission specification, or an RF condition, the analog signaling being associated with over-the-air (OTA) aggregation; and
updating the global machine learning model based on the received at least some local model update elements of the plurality of local model update elements.

30. The method of claim 29, wherein the dropping of the one or more local model update elements is associated with one or more resource units, and each resource unit in the one or more resource units is one of a resource element (RE), a subcarrier, a resource block (RB), or a subband.

* * * * *